Nov. 7, 1939.  H. LOEN  2,178,799
TEMPERATURE COMPENSATED INDICATING INSTRUMENT
Filed May 21, 1937
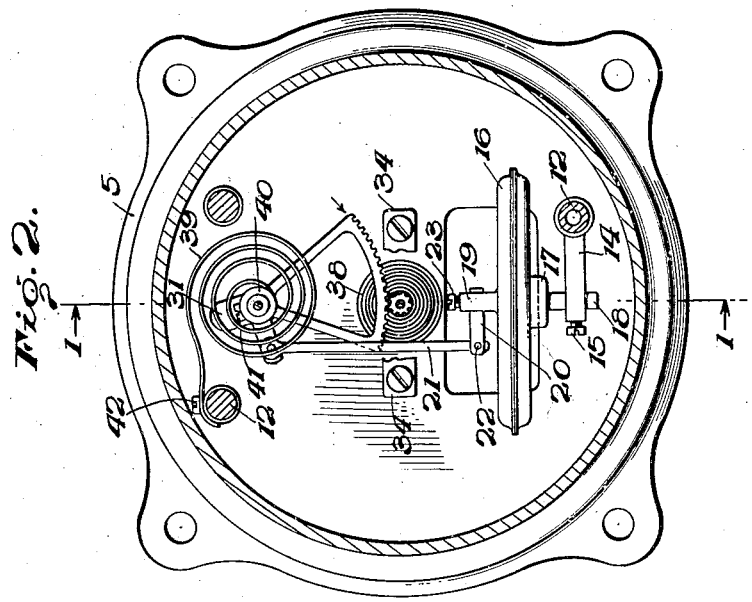
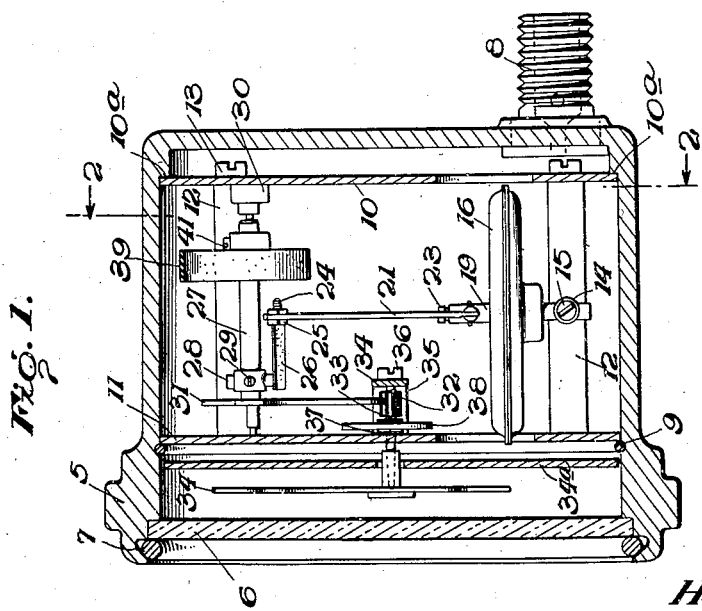
Inventor
Hans Loen.
By Stephen Cerstvik
Attorney Patented Nov. 7, 1939

2,178,799

UNITED STATES PATENT OFFICE 2,178,799

TEMPERATURE COMPENSATED INDICATING INSTRUMENT

Hans Loen, Bloomfield, N. J., assignor to Bendix Aviation Corporation, South Bend, Ind., a corporation of Delaware Application May 21, 1937, Serial No. 144,108

5 Claims. (Cl. 73—4)

The present invention relates to indicating instruments and more particularly to means for compensating the effect of temperature upon an indicating instrument.

Instruments utilizing expansible or resilient elements as their actuating means are subject to various sources of error. Upon a change in temperature for instance, the modulus of elasticity of the material used in the expanding or resilient element changes, thereby causing error.

Accordingly, one of the objects of the present invention is to provide novel means in an indicating or measuring instrument whereby the foregoing undesirable characteristic is eliminated.

Another object is to provide novel means in an indicating or measuring instrument whereby changes in the modulus of elasticity of the actuating element due to changes in temperature are compensated to eliminate errors in the instrument.

A further object is to provide novel means whereby the means utilized for compensation for changes in the modulus of elasticity may be adjusted so that the most effective compensation can be produced.

The above and further objects and advantages of the invention will appear more fully hereinafter from a consideration of the detailed description which follows, taken together with the accompanying drawing, wherein is illustrated one embodiment of the invention. It is to be expressly understood, however, that the drawing is for the purpose of illustration and description only and is not designed as a definition of the limits of the invention reference being had for this purpose to the appended claims.

In the drawing wherein like reference characters refer to like parts throughout the several views;.

Fig. 1 is a side elevation, partly in section, taken on line 1—1 of Fig. 2, of a device embodying the invention; and Fig. 2 is a transverse view taken along the line 2—2 of Fig. 1.

Referring to the drawing and more particularly to Fig. 1, 5 indicates a casing for enclosing the operating mechanism said casing being closed by cover glass 6 held in place by resilient ring 7. Screw fitting 8 passing through the rear of the casing furnishes means for introducing the outside static air pressure to the interior of the instrument casing.

The operating mechanism is mounted on a frame of any suitable type held in place by resilient ring 9 and abutments 10a. In the present embodiment, the frame comprises a rear member or plate 10 and a face plate 11, said plates being held in spaced relation by spacers 12 and screws 13.

Mounted on bottom spacer 12 by means of hollow rod 14 and screw 15, as shown in Fig. 2, is diaphragm 16, the lower side 17 of which has a rod 18 attached thereto and passing through hollow rod 14 in which it is locked in place by screw 15. Adjustably mounted in center post 19 on the other side of the diaphragm is a rod 20 to which is pivoted one end of link 21 by pin 22. Screw 23 fastens the rod 20 in place after it has been properly adjusted.

The novel means of the invention are now provided and for this purpose a bi-metal element 26 is rotatably connected to the other end of link 21 by means of thread pin 24 and nuts 25 (see Fig. 1). Bi-metal element 26 is adjustably mounted on rock shaft 27 by means of rod 28 slidably mounted in said rockshaft and locked in adjusted position therein by screw 29. By changing the position of rod 28 element 26 is moved bodily and transversely with respect to itself whereby its distance from the diaphragm 16 and rock shaft 57 is varied.

Element 26 is constructed of two different metals, in a manner well known in the art, the plane of whose mounting surfaces is normal to the axis of rod 28 while the axis of said bi-metal element is parallel to the axis of rockshaft 27. Upon expansion and contraction of the bi-metal element the effective lever arm between the link 21 and the rockshaft 27 is varied.

With changes in temperature the modulus of elasticity of the diaphragm or other expanding or resilient element changes. This change is indicated by a coefficient called the temperature coefficient of the modulus of elasticity. Upon a change in the modulus of elasticity; for a given increment in pressure, a different increment of expansion of the diaphragm or resilient element is produced at different temperatures. In order to compensate for this change, the bi-metal element is designed so that such change in expansion of the diaphragm will be compensated by a change in the effective lever arm between the bi-metal element and the rockshaft.

If the diaphragm is constructed of an ordinary metal having a negative temperature coefficient of modulus of elasticity, upon a decrease in temperature the amount of expansion of said diaphragm for a certain increment of pressure will be reduced from what it would be at a higher temperature. This reduction in expansion would be indicated by a reduced movement of the pointer. In order to compensate for said reduction the bi-metal element is so designed that it bends towards the rockshaft with a decrease in temperature thereby reducing the lever arm between said bi-metal element and said rockshaft. By the reduction of said lever arm the point of application of the force due to the expanding diaphragm, namely, the upper end of link 21, travels in a circular path of smaller radius whose center is the center of the rockshaft. A smaller expansion of diaphragm 16, therefore, is changed to an increased angular rotation of rockshaft 27 and such increased angular rotation is transmitted to the pointer thereby offsetting the reduced movement of the pointer due to the lesser expansion of the diaphragm at said lower temperature. The bi-metal element 26 is mounted on the slidable rod 28 so that the initial lever arm between the bi-metal element and the rockshaft can be accurately adjusted thereby enabling the adjustment of said lever arm to provide means whereby the most effective compensation can be produced, without injury to the bi-metal strip 26 or any impairment of the functions thereof.

The novel means transmit the motion of diaphragm 16 to the rockshaft 27 which is mounted for rotation by extensions thereof, one of which is journaled in boss 30 formed on back plate 10 and the other of which is journaled in front plate 11.

Mounted on rockshaft 27 adjacent rod 28 is sector gear 31 meshing with pinion 32 mounted for rotation with shaft 33 carrying pointer 34 at one end thereof moving over scale 34a. Shaft 33 is journaled at one end in plate 34 mounted on front plate 11 by spacers 35 and screws 36 and is journaled adjacent its other end in front plate 11. Attached to shaft 33 is collar 37 to which is fastened one end of a small spiral spring 38 the other end of which is connected to one of the spacers 35.

Also mounted on rockshaft 27 is large spiral spring 39 (see Fig. 2) whose connection to said rockshaft is similar to the connection of spring 38 to shaft 33 by means of collar 37 on said shaft 33 and which will now be set out in more detail.

Collar 40, best shown in Fig. 2, is mounted on rockshaft 27 and secured thereto by screw 41. Connected to said collar and adjacent said screw 41 is one end of said spring 39. This end of spring 39 is connected tangentially to said collar 40 whereby the effective lever arm of the force exerted by the spring on the rockshaft is maintained substantially constant regardless of the angular rotation of said rockshaft. By this tangential connection the torque exerted by the spring 39 is made constant throughout the range of the instrument. The spiral spring can be set to give positive or negative torque, but no change from positive to negative torque. Thus the link 21 is constantly under tension or compression but does not change from one to the other whether the instrument is going from its zero reading to the maximum reading or back from the maximum reading to the zero reading. There is, therefore, no lost motion in the pin joints of the link and readings going up the scale all correspond to readings coming down the scale. The application of the spring force tangentially to the collar maintains this torque constant throughout the entire range of the instrument.

Spiral spring 39 is connected to the frame of the instrument by being fastened to one of the upper spacers 12 through screw 42. Due to the fact that the spiral spring is so attached and by exerting a load on the diaphragm 16, oscillation due to vibration is greatly reduced and this reduction is made throughout the range of the instrument.

The small spiral spring 38 is attached to collar 37 in the same manner as spring 39 is connected to collar 40 and therefore exerts a constant torque on the shaft 33 throughout the range of the instrument and maintains the same surfaces of the teeth of the pinion 32 and sector gear 31 in contact thereby eliminating backlash between the rockshaft and pointer and further reducing vibration throughout the range of the instrument.

In the present embodiment the spiral spring 39 is constructed of suitable bi-metal material whereby it is possible to compensate for any shifts of zero reading due to temperature effects. At a constant temperature the bi-metal spring, mounted as shown, exerts a uniform torque thereby loading the diaphragm. With a change in temperature the torque of the bi-metal spiral spring changes causing a displacement of the diaphragm. By properly choosing the materials and sizes of the bi-metallic spring it can be designed so that the torque will increase or decrease by desired amounts with an increase in temperature. If an increase in temperature changes the physical dimensions of the elements of the operating mechanism so that the indication of the pointer has a plus error the bi-metallic spiral spring is so designed that the change in torque at the increase of temperature will change the load exerted on the diaphragm in such a manner and in such magnitude that an equal negative error will be introduced. This nullifies the error due to the temperature effect.

The operation of the device is as follows: When the diaphragm element 16 expands due for instance to a decrease in pressure on the outside thereof, link 21 is moved upwardly to actuate the bi-metal element 26 to thereby rotate rockshaft 27. The effective lever arm between the bi-metal element and the rockshaft is varied by temperature changes thereby offsetting changes in the expansion of the diaphragm 16 due to changes in temperature affecting its modulus of elasticity. Changes in the physical dimensions of the elements of the operating mechanism due to changes in temperature or, in other words, the zero compensation is effected by changes in torque of the bi-metal spiral spring 39. Bi-metal spring 39 also applies a uniform torque to the rockshaft whereby the elements between said rockshaft and the diaphragm are either under tension or compression and all backlash is eliminated. Also the load placed by the spiral spring 39 on the diaphragm and its connection between the movable and stationary parts of the instrument reduce vibration of the movable elements and the attachment of the spring 39 tangentially to the collar 40 applies a uniform torque throughout the range of the instrument. The movement transmitted to the rockshaft rotates the sector gear 31 thereby rotating pinion 32 and shaft 33 to rotate the pointer 34. Small spiral spring 38 prevents backlash between the pointer and the rockshaft, reduces vibration and by means of its attachment to collar 37, applies a corrective torque of constant value throughout the range of the instrument.

Means are therefore provided whereby errors due to temperature are compensated, and the most efficient setting for proper compensation can be accurately determined and set.

Although but one embodiment of the invention has been illustrated and described, further changes and modifications in form, materials and relative arrangement of parts, which will now appear to those skilled in the art, may be made without departing from the scope of the invention. Reference is, therefore, to be had to the appended claims for a definition of the limits of the invention.

What is claimed is:

1. In a device of the character described, a movable diaphragm, means mounted for rotation by the motion of said diaphragm, a bi-metal element, means adjustably connecting one end of said bi-metal element to said first means, the other end of said element being free to expand upon changes in temperature, means connecting said free end to said diaphragm, and means for bodily moving said element transversely whereby the distance between said mounted means and said element in a direction at right angles thereto may be adjusted.

2. A compensating element comprising a rockshaft, a bi-metal element parallel to said rockshaft, means adjustably connecting one end of said bi-metal element to said rockshaft the other end of said element being free to move with changes in temperature whereby the effective lever arm between said rockshaft and said element is varied with changes in temperature.

3. In a device of the character described, an expansible element, a rockshaft, means for converting the expansion of said element into rotation of said rockshaft comprising a thermal responsive element adjustably connected at one end to said rockshaft and parallel thereto, the other end of said element being free to move upon a change of temperature and means transmitting the movement of said expansible element to said free end.

4. An indicating instrument comprising an expansible element, a dial, indicating means mounted for movement over said dial, connecting means between said element and said indicating means comprising a rockshaft, and thermal responsive means fastened at one end for slidable adjustment laterally of itself and free at the other end, said expansible means being connected to one end of said thermal element and said rockshaft to the other end thereof.

5. In a device of the character described, an expansible element, a rockshaft, a bi-metal strip, means at one end of said strip adjustably mounting said strip parallel to said rockshaft, means for locking said strip in one parallel position thereof, and means connecting said expansible element and the other end of said strip.

HANS LOEN.